United States Patent [19]

Tschernatsch

[11] Patent Number: 5,613,820
[45] Date of Patent: Mar. 25, 1997

[54] CONTINUOUS-OPERATION CARGO-TRANSFER EQUIPMENT

[75] Inventor: Günther Tschernatsch, Schwabach, Germany

[73] Assignee: MAN TAKRAF Fördertechnik GmbH, Leipzig, Germany

[21] Appl. No.: 511,069

[22] Filed: Aug. 3, 1995

[30] Foreign Application Priority Data

Aug. 19, 1994 [DE] Germany .................. 44 29 536.7

[51] Int. Cl.$^6$ ................................. B65G 67/62
[52] U.S. Cl. .............. 414/138.6; 198/519; 414/139.3; 414/142.5; 414/143.1
[58] Field of Search ............... 198/519; 414/138.5, 414/138.6, 138.8, 139.1, 139.2, 139.3, 143.1, 142.5

[56] References Cited

U.S. PATENT DOCUMENTS 1,580,556  4/1926  Enard ..................... 414/138.5

FOREIGN PATENT DOCUMENTS 3624734  2/1988  Germany .................... 414/139.3
1-8127   1/1989  Japan ....................... 414/138.6
1217826  12/1970 United Kingdom ............. 414/138.6

Primary Examiner—Karen B. Merritt
Assistant Examiner—Janice L. Krizek
Attorney, Agent, or Firm—Max Fogiel

[57] ABSTRACT

A continuous-operation cargo-transfer equipment. It comprises bulk-cargo uptake mechanisms (4a), an upright conveyor-constituted shaft (4), a boom (5) with a conveyor mounted on it that seesaws up and down on a turntable (6), a gantry (10) that travels back and forth on a pontoon (2), intermediate belts (6b & 6c), and a tender-loading conveyor belt (16) that operates in conjunction with a bulk-goods expulsion spout (17) on a pivoting and displacing beam (12). Such equipment is employed outside ports for transferring bulk cargo from deep-draft ocean-going vessels to shallow-draft tenders. The object is to maintain the cargo-uptake point inside the deep-draft vessel (1) as steady as possible. The equipment is provided with two Counterweights (7 & 15). One counterweight (7) compensates for any listing that occurs when the boom wanders out of position. The other counterweight (15) compensates for any listing that accompanies the sweep of the tender-loading conveyor belt (16). The counterweights are forced by cables (8) into whatever position will counteract the motion of the beam, ensuring the stability of the pontoon.

11 Claims, 4 Drawing Sheets

CONTINUOUS-OPERATION CARGO-TRANSFER EQUIPMENT

BACKGROUND OF THE INVENTION

The present invention concerns continuous-operation cargo-transfer equipment. The equipment comprises bulk-cargo uptake mechanisms that operate inside the hold, an upright conveyor-constituted shaft, a boom that seesaws up and down on a turntable, a gantry that travels back and forth on a pontoon, intermediate belts, and a conveyor belt that operates in conjunction with a bulk-goods expulsion spout on a pivoting and displacing beam. Such equipment is employed outside ports for transferring bulk cargo from deep-draft ocean-going vessels to shallow-draft tenders in the form of lighters or barges or to ship-to-shore conveyors for example.

Existing equipment of this type employs clamshell cranes. They operate discontinuously and toss the cargo they unload into a hopper that operates as a temporary bunker on the equipment. The dry particles emit a lot of dust as they drop into the bunker from the open clamshell.

Clamshell cranes are less efficient weight for weight and in terms of steel consumption and mechanical and electric components than continuous-operation equipment, and require a lot of wiring.

SUMMARY OF THE INVENTION

The object of the present invention is bulk-cargo transfer equipment that is more lightly built and wherein the point where the cargo is picked up inside the ship, the uptake head on the most upstream conveyor screw, that is, is as steady as possible, whereby listing on the part of the pontoon that occurs when the deep-draft vessel unloading arm of the boom wanders out of position is compensated on one side of the pontoon and listing on that part of the pontoon that accompanies the sweep of the pivoting and displacing beam is compensated on the other side above the tender.

The equipment is mounted on a pontoon and essentially comprises uptake mechanisms, a perpendicular cargo-removal shaft, a cargo-transfer mechanism, a boom that accommodates a conveyor, a spout for transferring the cargo to a stationary intermediate belt, a belt that transfers cargo from a cargo distributor to a moving loading belt, and a tender-loading conveyor belt with a telescoping spout.

The boom seesaws with the cargo-removal shaft on one end and a counterweight on the other on the traveling turntable. The turntable rests on wheels and travels back and forth along the gantry between the two vessels subject to rack-and-pinion gears, allowing the uptake mechanisms to reach any point of the ship being unloaded. The slopes of the boom and cargo-removal shaft are adjusted as needed by piston-and-cylinder mechanisms, spindles, or winches.

The tender-loading conveyor belt travels subject to rack-and-pinion gears along a pivoting traveling-mechanisms support or loading beam. The traveling-mechanisms support pivots around the cargo-deposit point. It rests at that point on a pivot and at the other end on mechanisms that travel around a circular track on the pontoon.

In order to maintain the uptake point inside the ship being unloaded, the head of the screw, that is, as steady as possible, the equipment on the pontoon is provided with two counterweights. One counterweight compensates for any listing that occurs when the deep-draft vessel unloading arm of the boom wanders out of position and the other for any listing that accompanies the sweep of the pivoting and displacing beam. These counterweights are forced by cables for example into whatever position will counteract the motion of the boom and beam, whence they can compensate for the lack of equilibrium. The pontoon will not be at risk in the event of a malfunction, when a cable breaks for example. The only result will be a slight listing, and the operation will then be discontinued.

The cabin is mounted on the boom in the vicinity of the shaft suspension. The electrical system is mounted on the stationary gantry. Another cabin, for controlling the pivoting and displacing beam, is mounted on the pivoting tender-loading conveyor belt traveling-mechanisms support.

Once the job is finished, the equipment is taken out of operation. The deep-draft vessel unloading arm of the boom will have been pivoted in toward the pontoon with the cargo-removal shaft resting against it. The pivoting and displacing beam will have been retracted and pivoted back beyond the side of the pontoon.

To recommence operation, to begin transferring more cargo, that is, the crew, consisting of one operator for the deep-draft vessel unloading arm and another for the pivoting and displacing beam, moves the arm and beam into position.

The deep-draft vessel unloading arm operator must remain in control throughout the operation. The pivoting and displacing beam on the other hand can operate automatically for a specified length of time once it has been properly positioned if appropriately designed.

Each hold is emptied one stage at a time with the cargo-removal shaft pivoting and traveling back and forth.

The cargo is picked up in the illustrated embodiment by two heads. Each head is mounted on the lower end of an upright conveyor screw. Each screw is accommodated in a housing. The heads introduce the cargo into the housing. The housings are mounted on each side of a shaft that accommodates four conveyor belts. The screws force the cargo up through the housings, whence it falls into the shaft. The belts lift the cargo up and deposit it on the belt accommodated in the boom.

The shaft essentially comprises four upright conveyor belts joined together into a continuous outer surface. Mounted on one belt are sloping partitions. The cargo rests against the blades. The partitions seal the column of cargo hermetically all around and separate it into sections. It is lifted without being subjected to external pressure. All the components of the shaft are mutually stationary.

The cargo drops off the sloping partitions at the top of the shaft and onto the horizontal belt.

Appropriate measures (louvers, rubber lips, etc.) are taken at this and other transition points to ensure as tight a seal as possible. Since the overall route from the uptake head to the tender is extensively encapsulated, the equipment as a whole will emit very little dust while operating. All the belts travel relatively slowly to keep dust down as much as possible at the transition points.

There is a telescoping spout where the cargo is expelled from the tender-loading conveyor belt. The spout tapers out toward the bottom and is entirely enclosed in a sleeve.

A dust preventer is mounted on the lower end of the telescoping spout to ensure a vacuum between the spout and the sleeve and prevent too much dust from leaking out of the sleeve.

The telescoping spout is long enough to keep the distance between the top of the cargo heap and the bottom edge of the spout as short as possible.

The combination of screw conveyor and upright conveyor and of tender-loading belt and telescoping spout considerably elevates the efficiency of the continuous-operation bulk-cargo transfer equipment over equipment that combines uptakes and screws that have to lift material all the way up.

Since the overall route traveled by the cargo is walled in, there will be much less noise and dust than would occur with conventional equipment.

The "uptake mechanism", specifically the head and the screw, is no larger than necessary. The screw and its housing and the telescope are made of highly wear-resistant material.

Since the equipment generally executes only limited and simple motions, it can be particularly compact and reliable.

BRIEF DESCRIPTION OF THE DRAWINGS

One embodiment of the present invention will now be specified with reference to the accompanying schematic drawing, wherein.

DESCRIPTION OF THE PREFERRED EMBODIMENT

Figure 1:
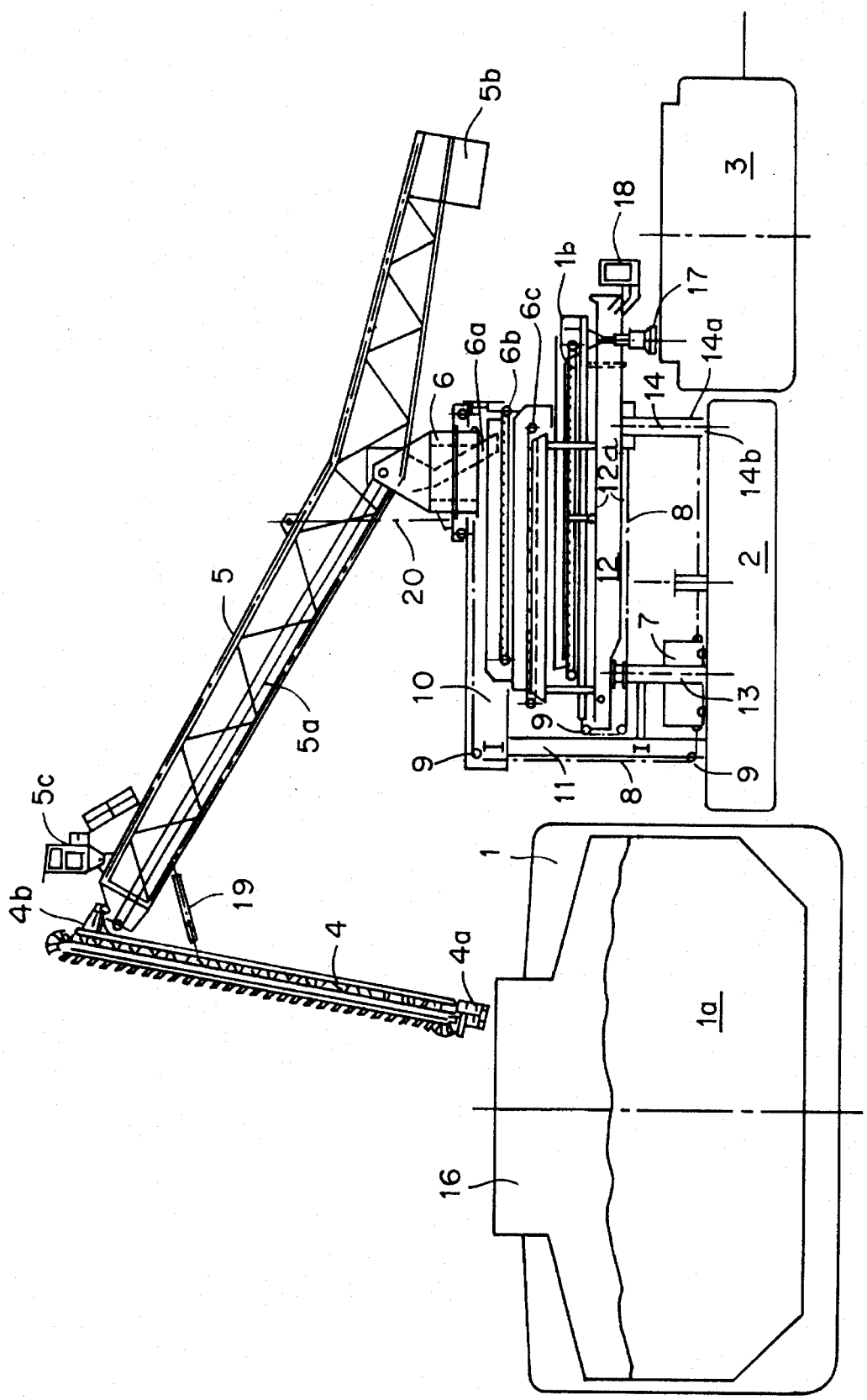
FIG. 1 is a section through continuous-operation bulk-cargo transfer equipment prior to the commencement of operations.

FIG. 1 is a section through continuous-operation bulk-cargo transfer equipment mounted on a pontoon 2 prior to commencement of the removal of cargo 1a through the hatchway 1b of a sea-going deep-draft vessel 1.

The equipment comprises bulk-cargo uptake mechanisms 4a, an upright cargo-removal shaft 4, a transition point 4b, a boom 5 with a conveyor belt 5a mounted on it, a spout 6a representing a transition to a stationary intermediate conveyor belt 6b, a conveyor belt 6c intermediate between transition point 4b and a pivoting and displacing beam 12, and a downstream telescoping spout 17. Boom 5 seesaws along with cargo-removal shaft 4 and a counterweight 5b on a traveling turntable 6. Turntable 6 rests on wheels and travels back and forth across a gantry 10, allowing bulk-cargo uptake mechanisms 4a to reach any point on deep-draft vessel 1. The slopes of boom 5 and cargo-removal shaft 4 are adjusted as needed by piston-and-cylinder mechanisms 19, 20.

Tender-loading conveyor belt 16 travels in accordance with the loading procedure along with pivoting and displacing beam 12 to above the hatch of the tender 3. Pivoting and displacing beam 12 rests on a pivot 13 and at the other end on a pivoting belt support 14 and wheels 14a that travel around a circular track 14b on pontoon 2.

To maintain the point of uptake in deep-draft vessel 1, the head of bulk-cargo uptake mechanisms 4a, that is, as steady as possible, the equipment on pontoon 2 is provided with two counterweights 7 and 15. Counterweight 7 compensates for any listing that occurs when boom 5 wanders out of position and counterweight 15 for any listing that accompanies the sweep of belt 16. Counterweights 7 and 15 are forced by cables 8 into whatever position will counteract the motion of the arm and beam, ensuring the stability of the pontoon.

Counterweight 7, which is connected by one cable 8 to the turntable 6 that travels back and forth on gantry 10, is in the vicinity of a gantry post 11 at the commencement of operations.

Counterweight 15 travels back and forth between rails 12a on pivoting and displacing beam 12 and is in the vicinity of pivoting belt support 14 as long as the tender-loading conveyor belt 16 is not extended.

Mounted on boom 5 where cargo-removal shaft 4 is articulated to it is a cabin 5c. There is another cabin 18 on the end of pivoting and displacing beam 12 on tender-loading conveyor belt 16.

Tender 3 is loaded without raising dust through telescoping spout 17 due to a vacuumized dust preventer at the outlet.

Figure 2:
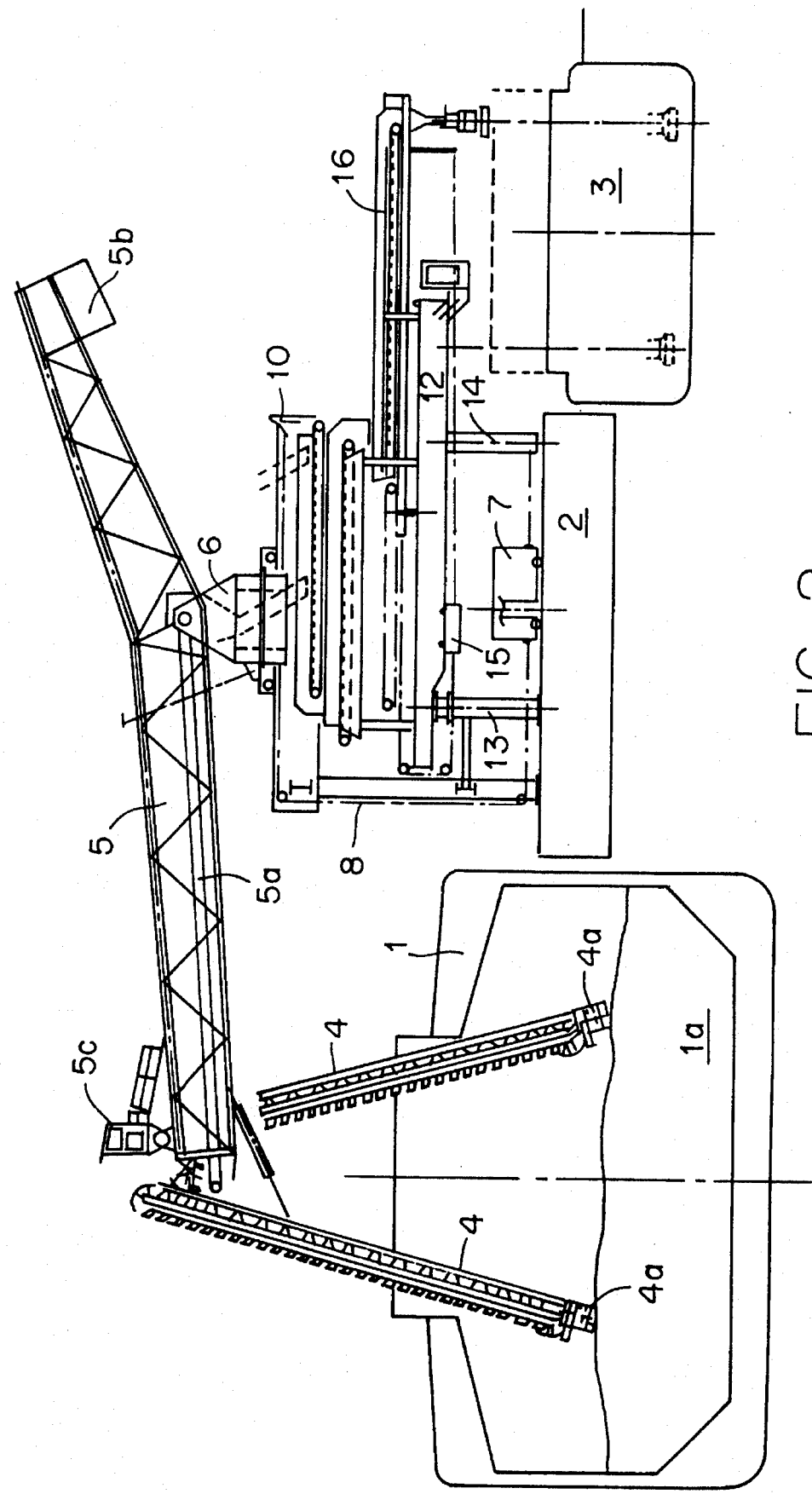
FIG. 2 is a section through the equipment in operation.

FIG. 2 is a section through continuous-operation bulk-cargo transfer equipment while cargo 1a is being transferred. Cargo-removal shaft 4 is illustrated twice, with its uptake mechanisms 4a first on the left and then on the right.

Boom 5 slopes slightly downward, turntable 6 is almost in the middle of gantry 10, and counterweight 7 is slightly away from the middle of pontoon 2.

Cargo 1a is deposited in the hold of tender 3, tender-loading conveyor belt 16 and telescoping spout 17 are all the way to the right, and associated counterweight 15 all the way to the left below pivoting and displacing beam 12.

Figure 3:
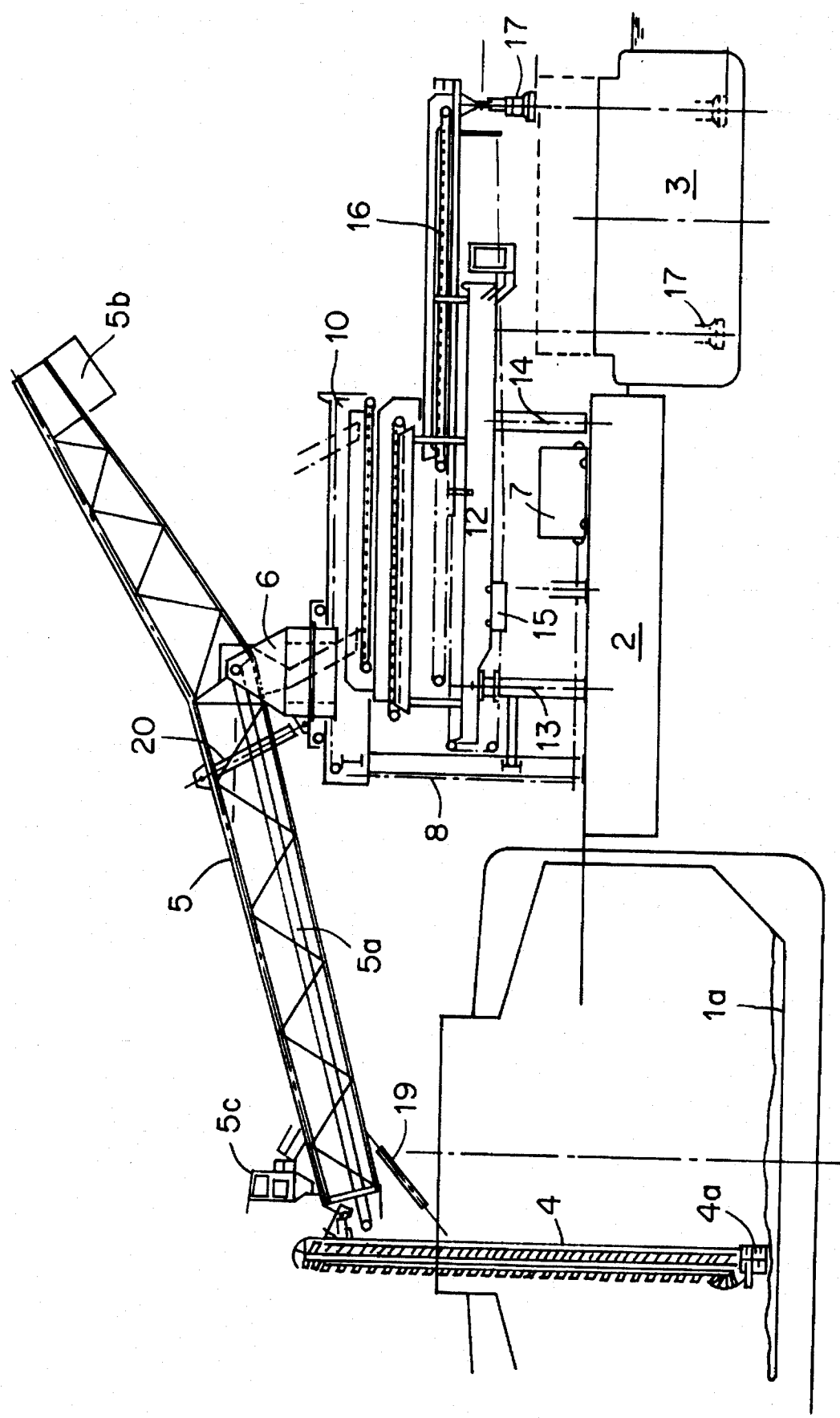
FIG. 3 is a section through the equipment prior to the termination of operations.

FIG. 3 is a section through continuous-operation bulk-cargo transfer equipment just before the termination of operations. The bulk-cargo uptake mechanisms 4a have almost arrived at the bottom of the hold in deep-draft vessel 1, boom 5 is steeply inclined, turntable 6 is almost all the way to the left on gantry 10, and traveling counterweight 7 is almost all the way to the right on pontoon 2.

Figure 4:
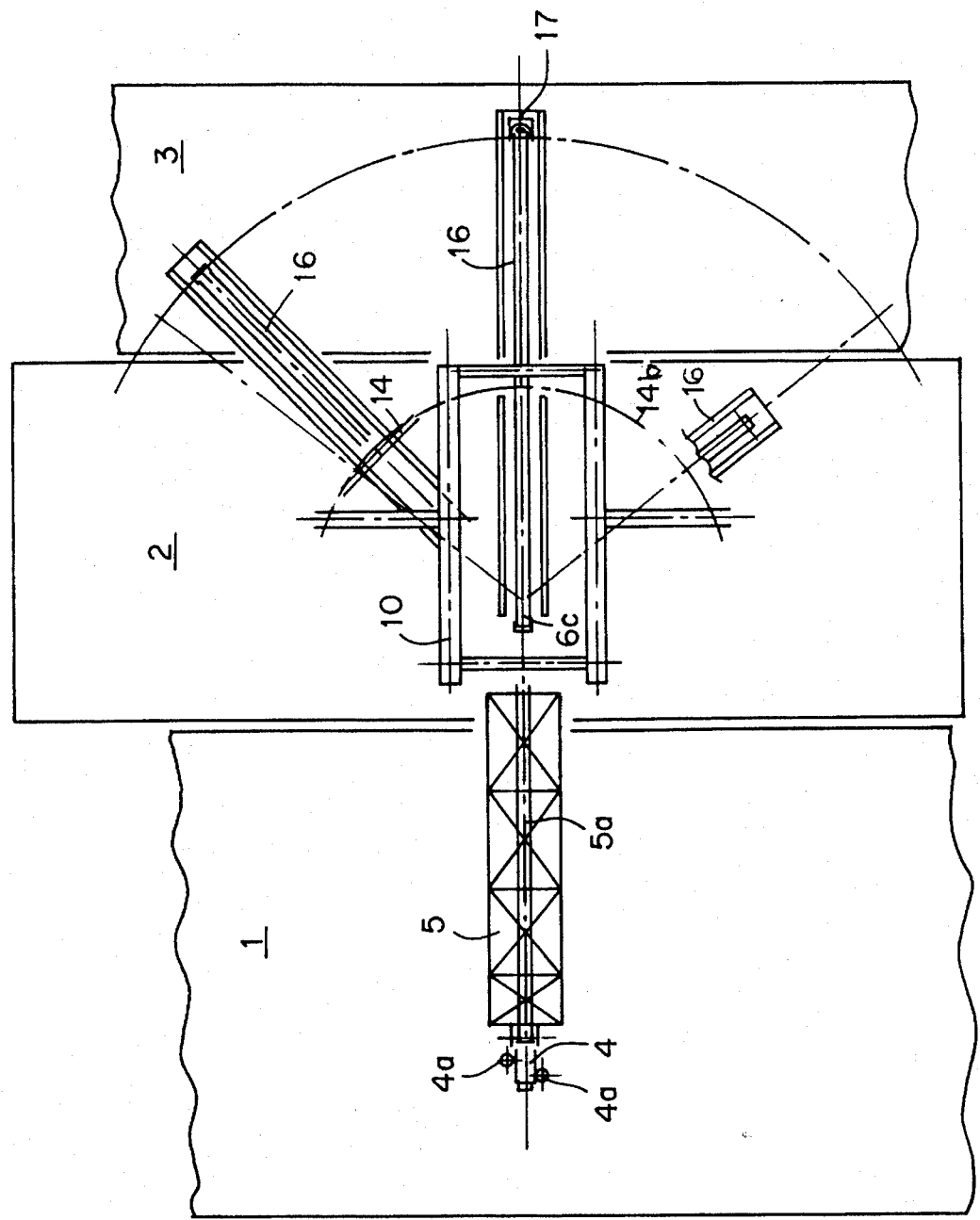
FIG. 4 is a top view of the equipment.

FIG. 4 is a top view of continuous-operation bulk-cargo transfer equipment that travels back and forth on a gantry 10 on pontoon 2. Bulk-cargo uptake mechanisms 4a, cargo-removal shaft 4, and boom 5 and boom-mounted conveyor belt 5a are in the ready position above the hold is deep-draft vessel 1. Tender-loading conveyor belt 16 is represented in three different positions. It travels back and forth on pivoting belt support 14 on wheels that roll along circular track 14b.

In its lowermost position, tender-loading conveyor belt 16 is retracted into the "parked" state. The longer radius represents pivoting and displacing beam 12 and tender-loading conveyor belt 16 in the extended position. Tender 3 is loaded through telescoping spout 17.

Pontoon 2 is self-propelled. To arrive at all cargo-removal points in the hold and to switch to the next hold, the pontoon advances an appropriate distance along deep-draft vessel 1. Tender 3 is lashed tight to pontoon 2 and accompanies its advance. Tender 3 can be warped from a winch on pontoon 2 when necessary.

I claim:

1. A continuous-operation cargo-transfer arrangement comprising bulk-cargo uptake means operating inside a hold, an upright conveyor shaft, a boom seesawing up and down on a turntable; a gantry traveling back and forth on a pontoon, intermediate belts, and a conveyor belt operating in conjunction with a bulk-goods expulsion spout mounted on a pivoting and displacing beam; said boom seesawing with a cargo-removal shaft on one end of said boom on said turntable traveling back and forth on said gantry, said turntable being attached to a first counterweight traveling back and forth on said pontoon by at least one cable wrapping around a winch; said conveyor belt and said spout being attached to a second counterweight traveling back and forth on said pivoting and displacing beam by a cable wrapping around a winch.

2. A continuous-operation cargo transfer arrangement as defined in claim 1, wherein said intermediate belts comprise stationary intermediate conveyor belts below a transition spout in said turntable.

3. A continuous-operation cargo transfer arrangement as defined in claim 1, wherein said conveyor belt travels along said pivoting and displacing beam with said spout.

4. A continuous-operation cargo transfer arrangement as defined in claim 1, wherein one of said intermediate belts is stationary.

5. A continuous-operation cargo transfer arrangement as defined in claim 1, wherein said pivoting and displacing beam is mounted on a pivot and on a pivoting belt support swinging around said pivot; and wheels on said support travel around a circular track on said pontoon.

6. A continuous-operation cargo transfer arrangement as defined in claim 1, wherein said second counterweight is a trolley traveling on rails mounted on said pivoting and displacing beam.

7. A continuous-operation cargo transfer arrangement as defined in claim 1, wherein displacement of said first and second counterweights is automatically governed by internal means.

8. A continuous-operation cargo transfer arrangement as defined in claim 1, wherein said arrangement transfers bulk cargo outside of a port from a deep-draft ocean-going vessel to a barge.

9. A continuous-operation cargo transfer arrangement as defined in claim 1, wherein said arrangement transfers bulk cargo outside of a port from a deep-draft ocean-going vessel to a ship-to-shore conveyor.

10. A continuous-operation cargo transfer arrangement as defined in claim 1, wherein said arrangement transfers bulk cargo outside of a port from a deep-draft ocean-going vessel to a lighter.

11. A continuous-operation cargo transfer arrangement as defined in claim 10, wherein said barge is lashed tight to said pontoon during a transfer.

* * * * *